United States Patent
Nagata et al.

(10) Patent No.: US 12,503,003 B2
(45) Date of Patent: Dec. 23, 2025

(54) NON-TRANSITORY COMPUTER READABLE MEDIUM, SERVER APPARATUS, AND METHOD FOR SERVICE TO SUPPLY ENERGY SOURCE TO VEHICLE

(71) Applicant: TOYOTA JIDOSHA KABUSHIKI KAISHA, Toyota (JP)

(72) Inventors: Yu Nagata, Chofu (JP); Shun Hashimoto, Kiyosu (JP); Kota Yamazaki, Kasugai (JP); Akane Masaki, Nisshin (JP); Wataru Eto, Nagoya (JP); Makoto Akahane, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 22 days.

(21) Appl. No.: 18/664,989

(22) Filed: May 15, 2024

(65) Prior Publication Data
US 2024/0383365 A1 Nov. 21, 2024

(30) Foreign Application Priority Data
May 17, 2023 (JP) .................................. 2023-081824

(51) Int. Cl.
*B60L 53/68* (2019.01)
*B60L 53/80* (2019.01)
*B60S 5/06* (2019.01)
*G06Q 10/0631* (2023.01)

(52) U.S. Cl.
CPC .............. *B60L 53/68* (2019.02); *B60L 53/80* (2019.02); *G06Q 10/06311* (2013.01); *B60S 5/06* (2013.01)

(58) Field of Classification Search
CPC ....... G06Q 10/00–50/00; B60L 1/00–2270/00; B60S 1/00–13/00
USPC ......................................................... 705/7.13
See application file for complete search history.

(56) References Cited

U.S. PATENT DOCUMENTS

| | | | |
|---|---|---|---|
| 8,565,789 B2 * | 10/2013 | Staffaroni | G06Q 10/08 455/456.2 |
| 11,216,824 B1 * | 1/2022 | Faga | G06Q 30/016 |
| 11,447,024 B1 * | 9/2022 | Brannan | B60L 53/665 |
| 11,710,095 B2 * | 7/2023 | Fujisawa | G06Q 30/0208 705/336 |
| 12,187,147 B2 * | 1/2025 | Brannan | B60L 58/12 |

(Continued)

FOREIGN PATENT DOCUMENTS

| | | | |
|---|---|---|---|
| CN | 106157625 A | 11/2016 | |
| JP | 2020-107303 A | 7/2020 | |
| WO | WO-2018072613 A1 * | 4/2018 | H04L 67/12 |

*Primary Examiner* — Alan S Miller
(74) *Attorney, Agent, or Firm* — Finnegan, Henderson, Farabow, Garrett and Dunner, LLP

(57) ABSTRACT

A terminal program for requesting a service to dispatch a service staff or a service vehicle to a location in which a user vehicle is parked and supply an energy source to the user vehicle causes a computer to execute operations, the operations including acquiring, before the user vehicle is parked in a parking location, first information regarding the parking location and transmitting request data including the acquired first information, and acquiring, after transmitting the request data, second information including information, not included in the first information, regarding the parking location and transmitting notification data including the acquired second information.

20 Claims, 6 Drawing Sheets

(56) References Cited

U.S. PATENT DOCUMENTS

| | | | | |
|---|---|---|---|---|
| 12,246,611 | B2* | 3/2025 | Brannan | G05D 1/661 |
| 2011/0202217 | A1* | 8/2011 | Kempton | G06Q 30/0601 |
| | | | | 320/109 |
| 2011/0225105 | A1* | 9/2011 | Scholer | G06Q 50/06 |
| | | | | 320/109 |
| 2012/0005031 | A1* | 1/2012 | Jammer | B60L 53/30 |
| | | | | 705/16 |
| 2012/0303397 | A1* | 11/2012 | Prosser | B60L 53/18 |
| | | | | 705/7.12 |
| 2018/0335777 | A1* | 11/2018 | Gibbs | B60W 30/06 |
| 2019/0089024 | A1* | 3/2019 | Enzinger | B60L 53/50 |
| 2019/0351783 | A1* | 11/2019 | Goei | G08G 1/202 |
| 2019/0385265 | A1* | 12/2019 | Liu | H04W 4/029 |
| 2020/0262307 | A1* | 8/2020 | Rosene | H04L 67/52 |
| 2021/0029488 | A1* | 1/2021 | Kaneichi | G01C 21/34 |
| 2021/0241626 | A1* | 8/2021 | Nishimura | G06Q 10/02 |
| 2022/0237543 | A1* | 7/2022 | Bjelcevic | G06Q 10/06315 |
| 2023/0136848 | A1* | 5/2023 | Kang | B60L 58/16 |
| | | | | 701/29.4 |
| 2023/0370335 | A1* | 11/2023 | Baird | G08B 25/10 |
| 2024/0010089 | A1* | 1/2024 | Williams | G01C 21/3438 |
| 2024/0257166 | A1* | 8/2024 | Valas | G06Q 50/10 |

* cited by examiner

NON-TRANSITORY COMPUTER READABLE MEDIUM, SERVER APPARATUS, AND METHOD FOR SERVICE TO SUPPLY ENERGY SOURCE TO VEHICLE

CROSS-REFERENCE TO RELATED APPLICATION

This application claims priority to Japanese Patent Application No. 2023-081824 filed on May 17, 2023, the entire contents of which are incorporated herein by reference.

TECHNICAL FIELD

The present disclosure relates to a terminal program and a server apparatus.

BACKGROUND

Patent Literature (PTL) 1 discloses a system to provide a service to charge vehicles on behalf of users and a service to dispatch power supply vehicles.

CITATION LIST

Patent Literature

PTL 1: JP 2020-107303 A
PTL 2: CN 106157625 A

SUMMARY

In a service to charge vehicles on behalf of users, the locations where agents pick up the vehicles to be charged are not determined until the users actually park the vehicles to be charged. Since the agents start travel toward the vehicles to be charged after the locations are found out, it takes time until the vehicles to be charged are picked up after being parked.

In a service to dispatch power supply vehicles, the locations to which the power supply vehicles are dispatched are not determined until the users actually park the vehicles to be charged. Since the power supply vehicles start travel toward the vehicles to be charged after the locations are found out, it takes time until the power supply vehicles arrive after the vehicles to be charged are parked.

It would be helpful to reduce time taken until users receive services to supply energy sources to vehicles after parking the vehicles.

A terminal program according to the present disclosure is a terminal program for requesting a service to dispatch a service staff or a service vehicle to a location in which a user vehicle is parked and supply an energy source to the user vehicle, the terminal program being configured to cause a computer to execute operations, the operations including:

acquiring, before the user vehicle is parked in a parking location, first information regarding the parking location and transmitting request data including the acquired first information; and acquiring, after transmitting the request data, second information including information, not included in the first information, regarding the parking location and transmitting notification data including the acquired second information.

A server apparatus according to the present disclosure includes:

a communication interface configured to communicate with a terminal apparatus configured to request a service to dispatch a service staff or a service vehicle to a location in which a user vehicle is parked and supply an energy source to the user vehicle; and a controller configured to:
upon receiving, from the terminal apparatus via the communication interface, request data including first information, acquired before the user vehicle is parked in a parking location, regarding the parking location and requesting the service, perform a process of causing the service staff or the service vehicle to start travel to the parking location; and upon receiving, from the terminal apparatus via the communication interface, notification data including second information, acquired after the request data is transmitted, including information, not included in the first information, regarding the parking location, perform a process of dispatching the service staff or the service vehicle, which has started the travel, to the parking location.

According to the present disclosure, time taken until users receive services to supply energy sources to vehicles after parking the vehicles is reduced.

DETAILED DESCRIPTION

Figure 1:
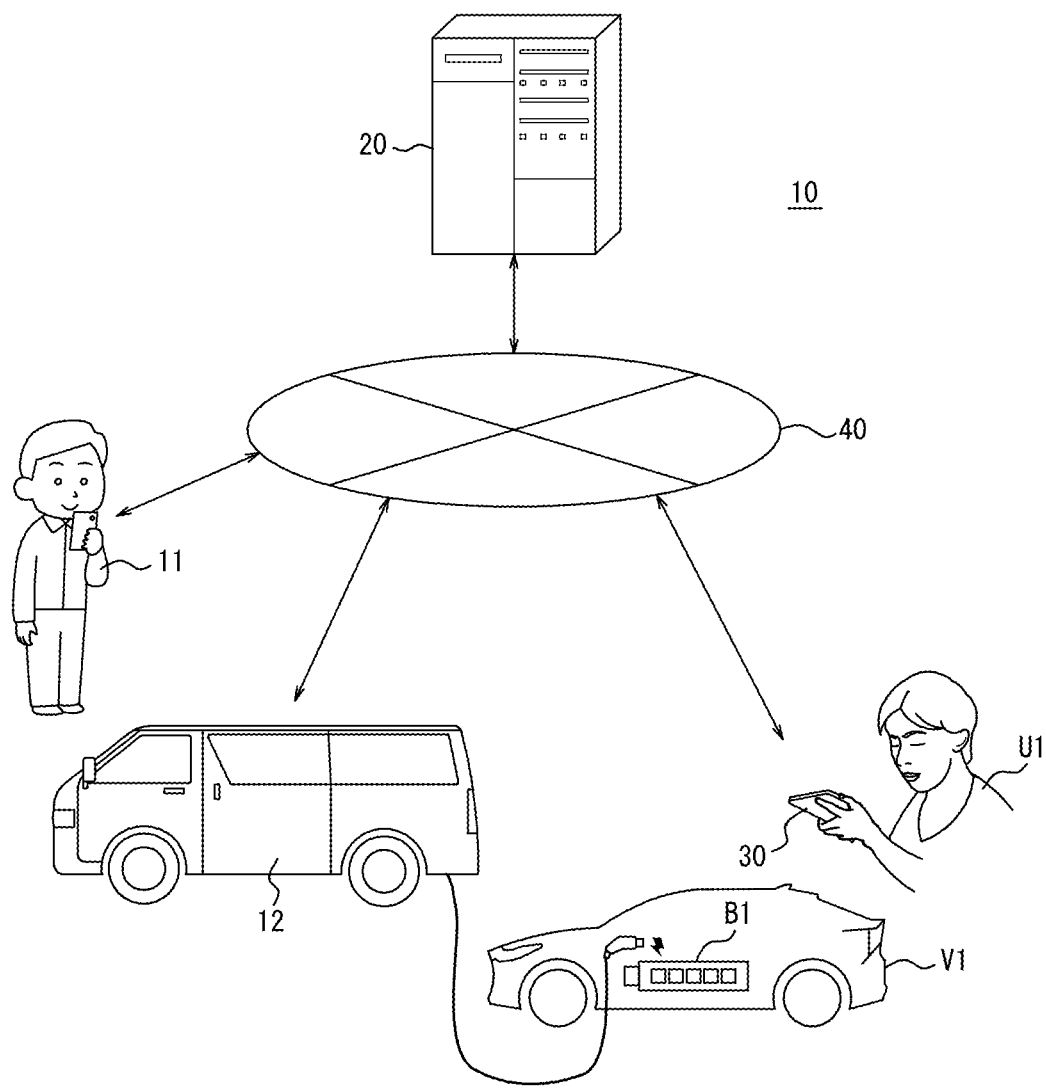
FIG. 1 is a diagram illustrating a configuration of a service provision system according to an embodiment of the present disclosure.

An embodiment of the present disclosure will be described below, with reference to the drawings.

In the drawings, the same or corresponding portions are denoted by the same reference numerals. In the descriptions of the present embodiment, detailed descriptions of the same or corresponding portions are omitted or simplified, as appropriate.

A configuration of a service provision system 10 according to the present embodiment will be described with reference to FIG. 1.

The service provision system 10 includes a server apparatus 20 and a terminal apparatus 30.

The server apparatus 20 can communicate with the terminal apparatus 30 via a network 40. The server apparatus 20 may be able to communicate via the network 40 with a mobile device such as a mobile phone, smartphone, or tablet held by a service staff 11. The server apparatus 20 may be able to communicate via the network 40 with an in-vehicle device installed in a service vehicle 12 or a mobile device such as a mobile phone, smartphone, or tablet held by a staff on board the service vehicle 12. The terminal apparatus 30 may also be able to communicate via the network 40 with the mobile device held by the service staff 11, the in-vehicle device installed in the service vehicle 12, or the mobile device held by the staff on board the service vehicle 12.

The server apparatus 20 is a computer that belongs to a cloud computing system or other computing system installed in a facility such as a data center. The server apparatus 20 is operated by a supply service provider.

The terminal apparatus 30 is, for example, a mobile device such as a mobile phone, smartphone, or tablet held by each user. The terminal apparatus 30 executes a terminal program to request a supply service.

The supply service is a service to dispatch the service staff 11 or the service vehicle 12 to a location in which a user vehicle is parked and supply an energy source to the user vehicle. In the present embodiment, the user vehicle is a BEV. The term "BEV" is an abbreviation of battery electric vehicle. The energy source to be supplied to the user vehicle is electricity. As a variation of the present embodiment, the user vehicle may be another type of automobile such as a gasoline vehicle, a diesel vehicle, a hydrogen vehicle, an HEV, a PHEV, or an FCEV. The term "HEV" is an abbreviation of hybrid electric vehicle. The term "PHEV" is an abbreviation of plug-in hybrid electric vehicle. The term "FCEV" is an abbreviation of fuel cell electric vehicle. The user vehicle may be a MaaS-dedicated vehicle. The term "MaaS" is an abbreviation of Mobility as a Service. The energy source to be supplied to the user vehicle is not limited to electricity, but may be gasoline, diesel fuel, hydrogen, or the like.

The supply service includes at least a charging service or a battery replacement service, and includes both of the charging service and the battery replacement service in the present embodiment. The charging service is a service to supply the energy source to the user vehicle by charging a battery installed in the user vehicle. The battery replacement service is a service to supply the energy source to the user vehicle by replacing the battery installed in the user vehicle with another battery. As a variation of the present embodiment, the supply service may include a service to refuel the user vehicle.

The supply service includes at least an agent-type service or a mobile-type service, and includes both of the agent-type service and the mobile-type service in the present embodiment. The agent-type service is a service to dispatch the service staff 11 to the location in which the user vehicle is parked, have the dispatched service staff 11 move the user vehicle to another location, and supply the energy source to the user vehicle in the location to which the user vehicle is moved. The mobile-type service is a service to dispatch the service vehicle 12 to the location in which the user vehicle is parked and have the dispatched service vehicle 12 supply the energy source to the user vehicle in the location in which the user vehicle is parked.

In the present embodiment, one of the following combinations of services is selected by each user or automatically, and provided as the supply service: a combination of the charging service and the agent-type service, a combination of the battery replacement service and the agent-type service, a combination of the charging service and the mobile-type service, and a combination of the battery replacement service and the mobile-type service. In other words, in the present embodiment, the agent-type charging service, the agent-type battery replacement service, the mobile-type charging service, or the mobile-type battery replacement service is selectively provided.

For example, in the agent-type charging service, while a user U1 is not using a user vehicle V1, a worker as the service staff 11 drives the user vehicle V1 from a parking lot to a charging station, charges a battery B1 of the user vehicle V1, and then returns the user vehicle V1. In the agent-type battery replacement service, while the user U1 is not using the user vehicle V1, the worker as the service staff 11 drives the user vehicle V1 from the parking lot to a battery replacement station, replaces the battery B1 of the user vehicle V1 with another battery, and then returns the user vehicle V1. In the mobile-type charging service, a mobile charging vehicle as the service vehicle 12 comes to the parking lot, and charges the battery B1 of the user vehicle V1 on the spot. In the mobile-type battery replacement service, a mobile battery replacement vehicle as the service vehicle 12 comes to the parking lot, and replaces the battery B1 of the user vehicle V1 with another battery on the spot.

The network 40 includes the Internet, at least one WAN, at least one MAN, or any combination thereof. The term "WAN" is an abbreviation of wide area network. The term "MAN" is an abbreviation of metropolitan area network. The network 40 may include at least one wireless network, at least one optical network, or any combination thereof. The wireless network is, for example, an ad hoc network, a cellular network, a wireless LAN, a satellite communication network, or a terrestrial microwave network. The term "LAN" is an abbreviation of local area network.

An outline of the present embodiment will be described with reference to FIG. 1.

Before the user vehicle is parked in a parking location, the terminal apparatus 30 acquires first information regarding the parking location and transmits request data to the server apparatus 20. The request data is data including the first information. In the present embodiment, the request data is data including the first information acquired before the user vehicle is parked in the parking location and requesting the supply service. Upon receiving the request data from the terminal apparatus 30, the server apparatus 20 performs a process of causing the service staff 11 or the service vehicle 12 to start travel to the parking location.

After transmitting the request data, the terminal apparatus 30 acquires second information including information, not included in the first information, regarding the parking location and transmits notification data to the server apparatus 20. The notification data is data including the second information. In other words, the notification data is data including the second information acquired after the request data is transmitted. The second information is information that is more detailed than the first information alone by combining the second information with the first information. For example, the address of a parking lot could be transmitted as the first information and the number of a parking space as the second information. Alternatively, the second information may be the information already sent in the first information and new information added thereto. In other words, the second information may be more detailed than the first information. Upon receiving the notification data from the terminal apparatus 30, the server apparatus 20 performs a process of dispatching the service staff 11 or the service vehicle 12, which has started the travel, to the parking location.

According to the present embodiment, the service staff 11 or the service vehicle 12 can be near the parking location before the user arrives at the parking location. As a result, time taken until the user receives the supply service after parking the user vehicle is reduced.

For example, when the user U1 receives the agent-type service, the service staff 11 needs to pick up the user vehicle V1. However, if the service staff 11 starts the travel toward the user vehicle V1 after the location where the service staff 11 picks up the user vehicle V1 is confirmed, it takes time until the user vehicle V1 is picked up after being parked. Therefore, the terminal apparatus 30 accepts input of the approximate parking position prior to arrival at the parking place and notifies the service staff 11 of the approximate parking position via the server apparatus 20. The terminal apparatus 30 then accepts the detailed parking position input and notifies the service staff 11 of that detailed parking position again via the server apparatus 20. Therefore, the service staff 11 can start the travel toward the user vehicle V1 before the location where the service staff 11 picks up the user vehicle V1 is confirmed. As a result, time taken until the user U1 receives the agent-type service after parking the user vehicle V1 is reduced.

As an example, if the user U1 uses the agent-type charging service while shopping, the service staff 11 can come near the store parking lot in advance if the user U1 tells the service staff 11 only the store name and other general location before arriving at the store parking lot. When the user U1 arrives at the store parking lot, he/she can again inform the service staff 11 of the parking position number and other details of the location, and the service staff 11 can immediately pick up the user vehicle V1. The timing for the user U1 to provide the detailed location to the service staff 11 is not limited to arrival at the parking lot. If the user U1 is able to reserve the store parking lot by the time when the user U1 arrives at the parking lot after requesting the agent-type charging service, the user U1 may provide the service staff 11 with the parking position number and other details of the location after reserving the parking lot and before arriving at the parking lot.

For example, when the user U1 receives the mobile-type service, the service vehicle 12 needs to stop in the vicinity of the user vehicle V1. However, if the service vehicle 12 starts the travel toward the user vehicle V1 after the location where the service vehicle 12 stops is confirmed, it takes time until the service vehicle 12 arrives after the user vehicle V1 is parked. Therefore, the terminal apparatus 30 accepts input of the approximate parking position prior to arrival at the parking place and notifies the service vehicle 12 or the staff on board the service vehicle 12 of that approximate parking position via the server apparatus 20. The terminal apparatus 30 then accepts the detailed parking position input and notifies the service vehicle 12 or the staff on board the service vehicle 12 of that detailed parking position again via the server apparatus 20. Therefore, the service vehicle 12 can start the travel toward the user vehicle V1 before the location where the service vehicle 12 stops is confirmed. As a result, time taken until the user U1 receives the mobile-type service after parking the user vehicle V1 is reduced.

The parking position may be entered manually or automatically. For example, the terminal apparatus 30 may accept a user operation to enter an approximate parking position into an application corresponding to the terminal program before arrival at the parking place, and then accept a user operation to enter a detailed parking position into the same application. Alternatively, the terminal apparatus 30 may accept a user operation to enter the reserved parking position into an application corresponding to the terminal program before arrival at the parking place, and then accept a user operation to enter the confirmed parking position into the same application after arrival at the parking place. The application may be used to reserve the parking position.

Alternatively, the terminal apparatus 30 may identify the approximate parking position by referring to the destination information obtained from the map application or the navigation device installed in the user vehicle V1 before arrival at the parking place, and then identify the detailed parking position by referring to the positioning information.

The parking position may be notified directly to the service staff 11, the service vehicle 12, or the staff on board the service vehicle 12, instead of being notified via the server apparatus 20. In other words, instead of transmitting the request data and the notification data to the server apparatus 20, the terminal apparatus 30 may transmit the data to a mobile device held by the service staff 11, an in-vehicle device installed in the service vehicle 12, or a mobile device held by the staff on board the service vehicle 12. Before transmitting the request data, the terminal apparatus 30 may transmit data not including information regarding the parking location, but only requesting the supply service to the server apparatus 20. The server apparatus 20 may, in response to data requesting the supply service, perform the process of dispatching the service staff or the service vehicle 12 to the parking location, while working with the mobile device held by the service staff 11, the in-vehicle device installed in the service vehicle 12, or the mobile device held by the staff on board the service vehicle 12, which subsequently receives the request data and the notification data.

Figure 2:
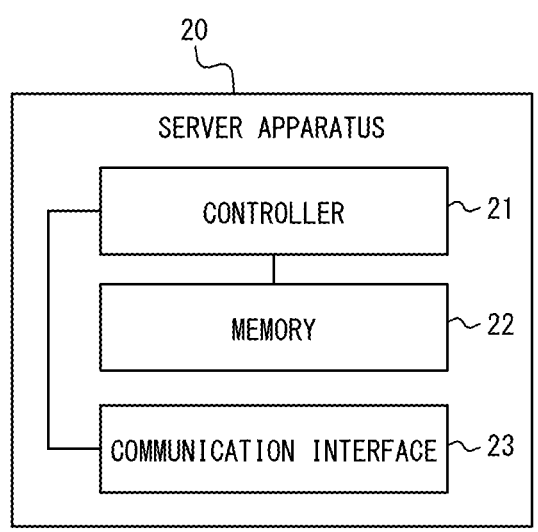
FIG. 2 is a block diagram illustrating a configuration of a server apparatus according to the embodiment of the present disclosure.

A configuration of the server apparatus 20 according to the present embodiment will be described with reference to FIG. 2.

The server apparatus 20 includes a controller 21, a memory 22, and a communication interface 23.

The controller 21 includes at least one processor, at least one programmable circuit, at least one dedicated circuit, or any combination thereof. The processor is a general purpose processor such as a CPU or a GPU, or a dedicated processor that is dedicated to specific processing. The term "CPU" is an abbreviation of central processing unit. The term "GPU" is an abbreviation of graphics processing unit. The programmable circuit is, for example, an FPGA. The term "FPGA" is an abbreviation of field-programmable gate array. The dedicated circuit is, for example, an ASIC. The term "ASIC" is an abbreviation of application specific integrated circuit. The controller 21 executes processes related to operations of the server apparatus 20 while controlling components of the server apparatus 20.

The memory 22 includes at least one semiconductor memory, at least one magnetic memory, at least one optical memory, or any combination thereof. The semiconductor memory is, for example, RAM, ROM, or flash memory. The term "RAM" is an abbreviation of random access memory. The term "ROM" is an abbreviation of read only memory. The RAM is, for example, SRAM or DRAM. The term "SRAM" is an abbreviation of static random access memory. The term "DRAM" is an abbreviation of dynamic random access memory. The ROM is, for example, EEPROM. The term "EEPROM" is an abbreviation of electrically erasable programmable read only memory. The flash memory is, for example, SSD. The term "SSD" is an abbreviation of solid-state drive. The magnetic memory is, for example, HDD. The term "HDD" is an abbreviation of hard disk drive. The memory 22 functions as, for example, a main memory, an auxiliary memory, or a cache memory. The memory 22 stores data to be used for operations of the server apparatus 20 and data obtained by the operations of the server apparatus 20.

The communication interface 23 includes at least one communication module. The communication module is, for example, a module compatible with a wired LAN communication standard such as Ethernet® (Ethernet is a registered trademark in Japan, other countries, or both) or a wireless LAN communication standard such as IEEE802.11. The name "IEEE" is an abbreviation of Institute of Electrical and Electronics Engineers. The communication interface 23 communicates with the terminal apparatus 30. The communication interface 23 may communicate with the mobile device held by the service staff 11. The communication interface 23 may communicate with the in-vehicle device installed in the service vehicle 12 or the mobile device held by the staff on board the service vehicle 12. The communication interface 23 receives data to be used for the operations of the server apparatus 20, and transmits data obtained by the operations of the server apparatus 20.

The functions of the server apparatus 20 are realized by execution of a server program according to the present embodiment by a processor serving as the controller 21. That is, the functions of the server apparatus 20 are realized by software. The server program causes a computer to execute the operations of the server apparatus 20, thereby causing the computer to function as the server apparatus 20. That is, the computer executes the operations of the server apparatus 20 in accordance with the server program to thereby function as the server apparatus 20.

The program can be stored on a non-transitory computer readable medium. The non-transitory computer readable medium is, for example, flash memory, a magnetic recording device, an optical disc, a magneto-optical recording medium, or ROM. The program is distributed, for example, by selling, transferring, or lending a portable medium such as an SD card, a DVD, or a CD-ROM on which the program is stored. The term "SD" is an abbreviation of Secure Digital. The term "DVD" is an abbreviation of digital versatile disc. The term "CD-ROM" is an abbreviation of compact disc read only memory. The program may be distributed by storing the program in a storage of a server and transferring the program from the server to another computer. The program may be provided as a program product.

For example, the computer temporarily stores, in a main memory, a program stored in a portable medium or a program transferred from a server. Then, the computer reads the program stored in the main memory using a processor, and executes processes in accordance with the read program using the processor. The computer may read a program directly from the portable medium, and execute processes in accordance with the program. The computer may, each time a program is transferred from the server to the computer, sequentially execute processes in accordance with the received program. Instead of transferring a program from the server to the computer, processes may be executed by a so-called ASP type service that realizes functions only by execution instructions and result acquisitions. The term "ASP" is an abbreviation of application service provider. Programs encompass information that is to be used for processing by an electronic computer and is thus equivalent to a program. For example, data that is not a direct command to a computer but has a property that regulates processing of the computer is "equivalent to a program" in this context.

Some or all of the functions of the server apparatus 20 may be realized by a programmable circuit or a dedicated circuit serving as the controller 21. That is, some or all of the functions of the server apparatus 20 may be realized by hardware.

Figure 3:
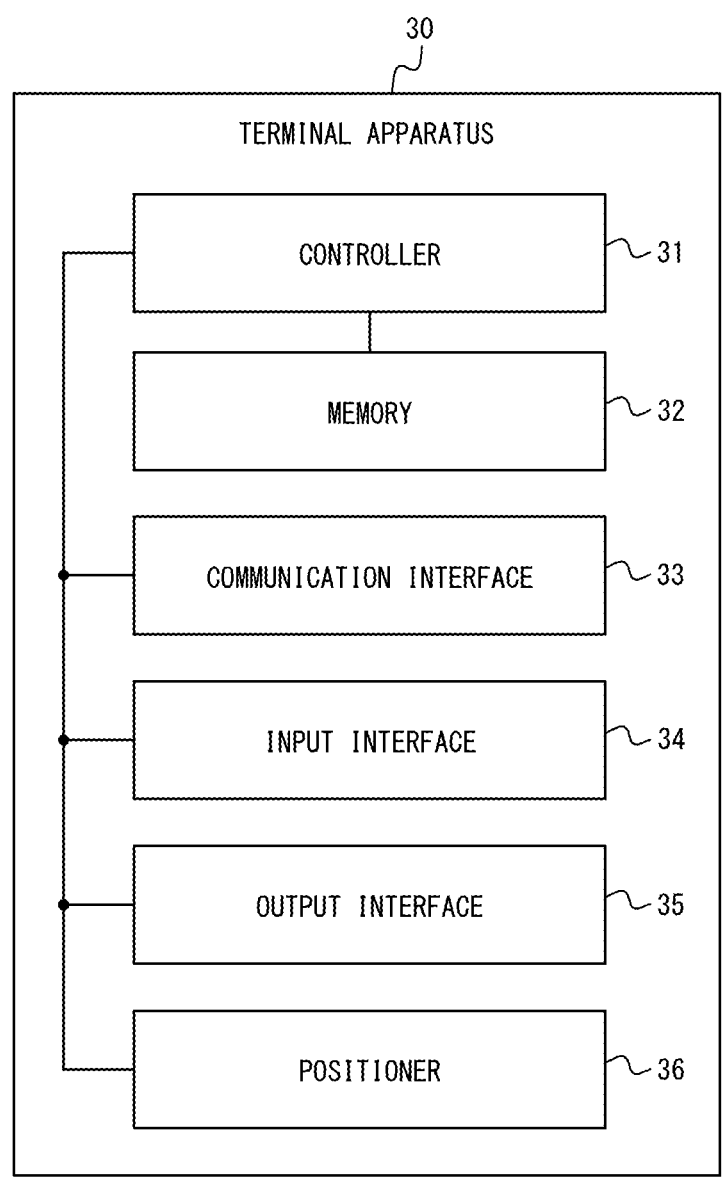
FIG. 3 is a block diagram illustrating a configuration of a terminal apparatus according to the embodiment of the present disclosure.

A configuration of the terminal apparatus 30 according to the present embodiment will be described with reference to FIG. 3.

The terminal apparatus 30 includes a controller 31, a memory 32, a communication interface 33, an input interface 34, an output interface 35, and a positioner 36.

The controller 31 includes at least one processor, at least one programmable circuit, at least one dedicated circuit, or any combination thereof. The processor is a general purpose processor such as a CPU or a GPU, or a dedicated processor that is dedicated to specific processing. The programmable circuit is, for example, an FPGA. The dedicated circuit is, for example, an ASIC. The controller 31 executes processes related to operations of the terminal apparatus 30 while controlling components of the terminal apparatus 30.

The memory 32 includes at least one semiconductor memory, at least one magnetic memory, at least one optical memory, or any combination thereof. The semiconductor memory is, for example, RAM, ROM, or flash memory. The RAM is, for example, SRAM or DRAM. The ROM is, for example, EEPROM. The flash memory is, for example, SSD. The magnetic memory is, for example, HDD. The memory 32 functions as, for example, a main memory, an auxiliary memory, or a cache memory. The memory 32 stores data to be used for the operations of the terminal apparatus 30 and data obtained by the operations of the terminal apparatus 30.

The communication interface 33 includes at least one communication module. The communication module is, for example, a module compatible with a mobile communication standard such as LTE, the 4G standard, or the 5G standard, a wireless LAN communication standard such as IEEE802.11. The term "LTE" is an abbreviation of Long Term Evolution. The term "4G" is an abbreviation of 4th generation. The term "5G" is an abbreviation of 5th generation. The communication interface 33 communicates with the server apparatus 20. The communication interface 33 may communicate with the mobile device held by the service staff 11. The communication interface 33 may communicate with the in-vehicle device installed in the service vehicle 12 or the mobile device held by the staff on board the service vehicle 12. The communication interface 33 receives data to be used for the operations of the terminal apparatus 30, and transmits data obtained by the operations of the terminal apparatus 30.

The input interface 34 is, for example, a physical key, a capacitive key, a pointing device, a touch screen integrally provided with a display, a visible light camera, a LiDAR sensor, or a microphone. The term "LiDAR" is an abbreviation of light detection and ranging. The input interface 34 accepts an operation for inputting data to be used for the operations of the terminal apparatus 30. The input interface 34, instead of being included in the terminal apparatus 30, may be connected to the terminal apparatus 30 as an external input device. As an interface for connection, an interface compliant with a standard such as USB, HDMI® (HDMI is a registered trademark in Japan, other countries, or both), or Bluetooth® (Bluetooth is a registered trademark in Japan, other countries, or both) can be used. The term "USB" is an abbreviation of Universal Serial Bus. The term "HDMI®" is an abbreviation of High-Definition Multimedia Interface.

The output interface 35 is, for example, a display or a speaker. The display is, for example, an LCD or an organic EL display. The term "LCD" is an abbreviation of liquid crystal display. The term "EL" is an abbreviation of electro luminescent. The output interface 35 outputs data obtained by the operations of the terminal apparatus 30. The output interface 35, instead of being included in the terminal apparatus 30, may be connected to the terminal apparatus 30 as an external output device. As an interface for connection, an interface compliant with a standard such as USB, HDMI® (HDMI is a registered trademark in Japan, other countries, or both), or Bluetooth® (Bluetooth is a registered trademark in Japan, other countries, or both) can be used.

The positioner 36 includes at least one GNSS receiver. The term "GNSS" is an abbreviation of global navigation satellite system. GNSS is, for example, GPS, QZSS, BDS, GLONASS, or Galileo. The term "GPS" is an abbreviation of Global Positioning System. The term "QZSS" is an abbreviation of Quasi-Zenith Satellite System. QZSS satellites are called quasi-zenith satellites. The term "BDS" is an abbreviation of BeiDou Navigation Satellite System. The term "GLONASS" is an abbreviation of Global Navigation Satellite System. The positioner 36 measures the position of the terminal apparatus 30.

The functions of the terminal apparatus 30 are realized by execution of the terminal program according to the present embodiment by a processor serving as the controller 31. That is, the functions of the terminal apparatus 30 are realized by software. The terminal program causes a computer to execute the operations of the terminal apparatus 30, thereby causing the computer to function as the terminal apparatus 30. That is, the computer executes the operations of the terminal apparatus 30 in accordance with the terminal program to thereby function as the terminal apparatus 30.

Some or all of the functions of the terminal apparatus 30 may be realized by a programmable circuit or a dedicated circuit serving as the controller 31. That is, some or all of the functions of the terminal apparatus 30 may be realized by hardware.

Figure 4:
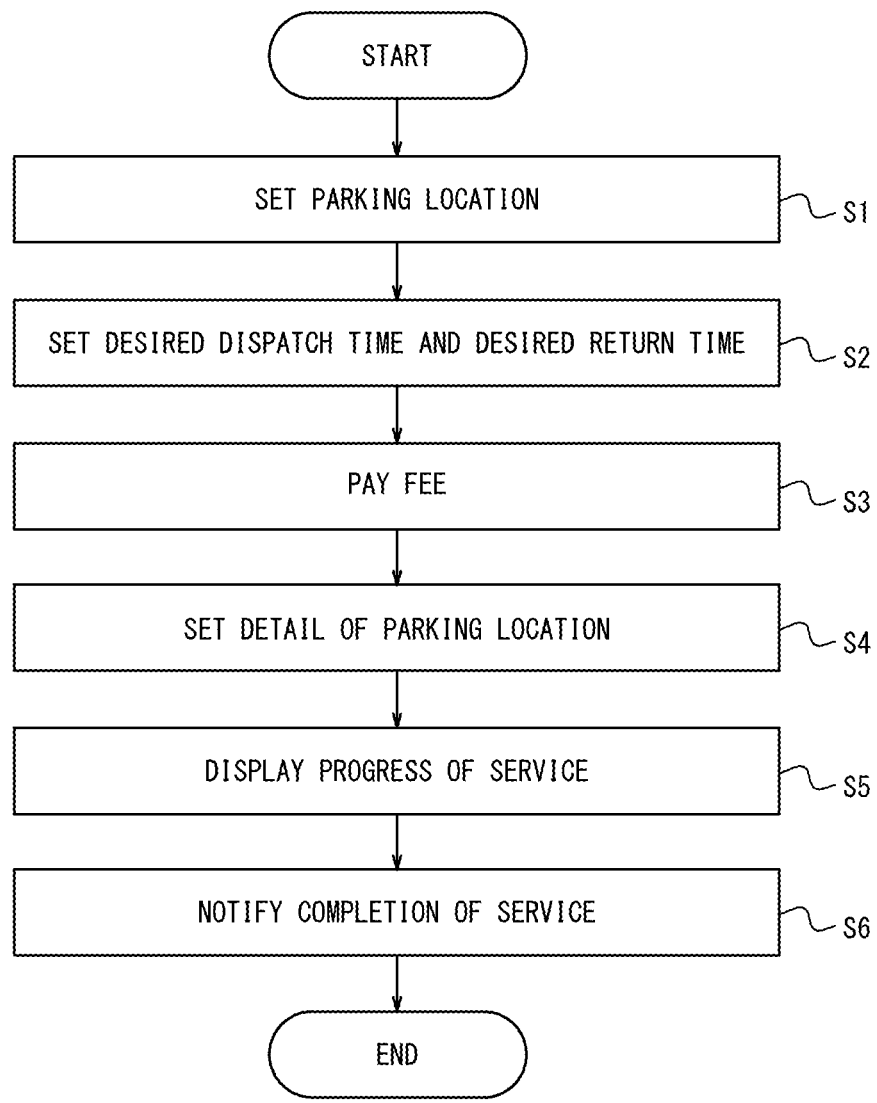
FIG. 4 is a flowchart illustrating operations of the service provision system according to the embodiment of the present disclosure.

With reference to FIG. 4, operations of the service provision system 10 according to the present embodiment will be described. The operations described below correspond to a service provision method according to the present embodiment. In other words, the service provision method according to the present embodiment includes steps S1 through S6 illustrated in FIG. 4.

When the user U1 starts the terminal program to request the supply service or selects a specific item such as "request service" on a menu screen of the terminal program, step S1 is executed.

At least steps S1 through S3 are performed before the user vehicle V1 is parked in the parking location. Step S4 is performed after the user vehicle V1 is parked in the parking location. Alternatively, step S4 may be performed before the user vehicle V1 is parked in the parking location, if the details of the parking location are fixed, such as by reservation. Step S5 is performed after S4 in the present embodiment, but may also be performed during S3 and S4.

In S1, the controller 31 of the terminal apparatus 30 acquires first information regarding the parking location by accepting, via the input interface 34, a first user operation to input the first information. Alternatively, the controller 31 of the terminal apparatus 30 may acquire the first information by referring to the destination information stored in the memory 32 to identify the parking location. Alternatively, the controller 31 of the terminal apparatus 30 may acquire the first information by identifying the parking location by referring to the destination information received from the navigation device installed in the user vehicle V1 via the communication interface 33. The first information includes information on the approximate parking position, such as the name or address of a store or other building associated with the parking lot, the name or address of the parking lot itself, or the name of the municipality or other area in which the parking lot is located.

In S2, the controller 31 of the terminal apparatus 30 accepts, via the input interface 34, a second user operation to input a desired dispatch time and a desired return time. The desired dispatch time corresponds to the time when the service staff 11 picks up the user vehicle V1, as desired by the user U1 in the case of the agent-type service. The desired dispatch time corresponds to the time when the service vehicle 12 arrives in the vicinity of the user vehicle V1, as desired by the user U1 in the case of the mobile-type service. The desired return time corresponds to the time when the service staff 11 returns the user vehicle V1 after charging or battery replacement, as desired by the user U1 in the case of the agent-type service. The desired return time corresponds to the time when the service vehicle 12 completes charging or battery replacement of the user vehicle V1, as desired by the user U1 in the case of the mobile-type service.

In S3, the controller 31 of the terminal apparatus 30 accepts, via the input interface 34, a third user operation to pay for the supply service. In the third user operation, a fee may be paid with a fixed payment method or a payment method may be selected. Payment method options include, for example, paying a package rate applied within a specific area, consuming a single use of the number of uses set in subscription, or paying a one-time fee.

The controller 31 of the terminal apparatus 30 transmits the request data to the server apparatus 20 via the communication interface 33. The request data is data including the first information acquired in S1 and requesting the supply service. In the present embodiment, the request data includes data indicating the desired dispatch time and the desired return time input by the second user operation in S2. The request data may include data indicating a payment method selected by the third user operation.

Upon receiving the request data from the terminal apparatus 30 via the communication interface 23, the controller 21 of the server apparatus 20 automatically processes payment for the supply service according to the received request data. Once the automatic process of payment is completed, the controller 21 of the server apparatus 20 performs a process of causing the service staff 11 or the service vehicle 12 to start travel to the parking location with reference to the first information included in the received request data. Specifically, the controller 21 of the server apparatus 20 notifies, of the request data, a manager who selects the type of the supply service according to the positional relationship between the service staff 11 or the service vehicle 12 and the parking location and causes the service staff 11 or the service vehicle 12 to start the travel to the parking location. Alternatively, the controller 21 of the server apparatus 20 may automatically select the type of the supply service according to the positional relationship between the service staff 11 or the service vehicle 12 and the parking location, and cause the service staff 11 or the service vehicle 12 to start the travel to the parking location.

For example, when the distance or time required from the position of a worker, as the service staff 11, to the parking location is less than or equal to a threshold value, the controller 21 of the server apparatus 20 may transmit first instruction data via the communication interface 23 to a mobile device held by the worker. When the distance or time required from the position of a mobile charging vehicle, as the service vehicle 12, to the parking location is less than or equal to a threshold value, the controller 21 of the server apparatus may transmit second instruction data via the communication interface 23 to an in-vehicle device installed in the mobile charging vehicle or a mobile device held by a worker on board the mobile charging vehicle. When the distance or time required from the position of a mobile battery replacement vehicle, as the service vehicle 12, to the parking location is less than or equal to a threshold value, the controller 21 of the server apparatus 20 transmits third instruction data via the communication interface 23 to an in-vehicle device installed in the mobile battery replacement vehicle or a mobile device held by a worker on board the mobile battery replacement vehicle. The first, second, and third instruction data is data including the first information and instructing the worker, the mobile charging vehicle or the mobile battery replacement vehicle, or the worker on board the mobile charging vehicle or the mobile battery replacement vehicle to start the travel to the parking location. The first, second, and third instruction data may include the data indicating the desired dispatch time and the desired return time.

In S4, the controller 31 of the terminal apparatus 30 acquires second information including information, not included in the first information, regarding the parking location by accepting, via the input interface 34, a fourth user operation to input the second information. Alternatively, the controller 31 of the terminal apparatus 30 may acquire the second information by referring to the positioning results obtained from the positioner 36 to identify the detailed location of the parking location. The second information includes information on the detailed parking position, such as a parking floor, a parking position number, 2-D or 3-D coordinates of the parking position, or the complete address of the parking lot. The second information may include, for example, a photograph of the area around the user vehicle V1 when the user U1 has already parked the user vehicle V1 in the parking location.

The controller 31 of the terminal apparatus 30 transmits notification data to the server apparatus 20 via the communication interface 33. The notification data is data including the second information.

Upon receiving the notification data from the terminal apparatus 30 via the communication interface 23, the controller 21 of the server apparatus 20 performs a process of dispatching the service staff 11 or the service vehicle 12, which has started the travel in S3, to the parking location with reference to the second information included in the received notification data. Specifically, the controller 21 of the server apparatus 20 notifies the notification data to the manager who dispatches the service staff 11 or the service vehicle 12, which has started the travel in S3, to the parking location. Alternatively, the controller 21 of the server apparatus 20 may dispatch the service staff 11 or the service vehicle 12, which has started the travel in S3, to the parking location.

For example, if the first instruction data has been transmitted in S3, the controller 21 of the server apparatus 20 transmits fourth instruction data via the communication interface 23 to the mobile device held by the worker as the service staff 11. If the second instruction data has been transmitted in S3, the controller 21 of the server apparatus 20 transmits fifth instruction data via the communication interface 23 to the in-vehicle device installed in the mobile charging vehicle as the service vehicle 12 or the mobile device held by the worker on board the mobile charging vehicle. If the third instruction data has been transmitted in S3, the controller 21 of the server apparatus 20 transmits sixth instruction data via the communication interface 23 to the in-vehicle device installed in the mobile battery replacement vehicle as the service vehicle 12 or the mobile device held by the worker on board the mobile battery replacement vehicle. The fourth, fifth, and sixth instruction data is data including the second information and instructing the worker, the mobile charging vehicle or mobile battery replacement vehicle, or the worker on board the mobile charging vehicle or mobile battery replacement vehicle to complete the travel to the parking location and provide the supply service.

Figure 5:
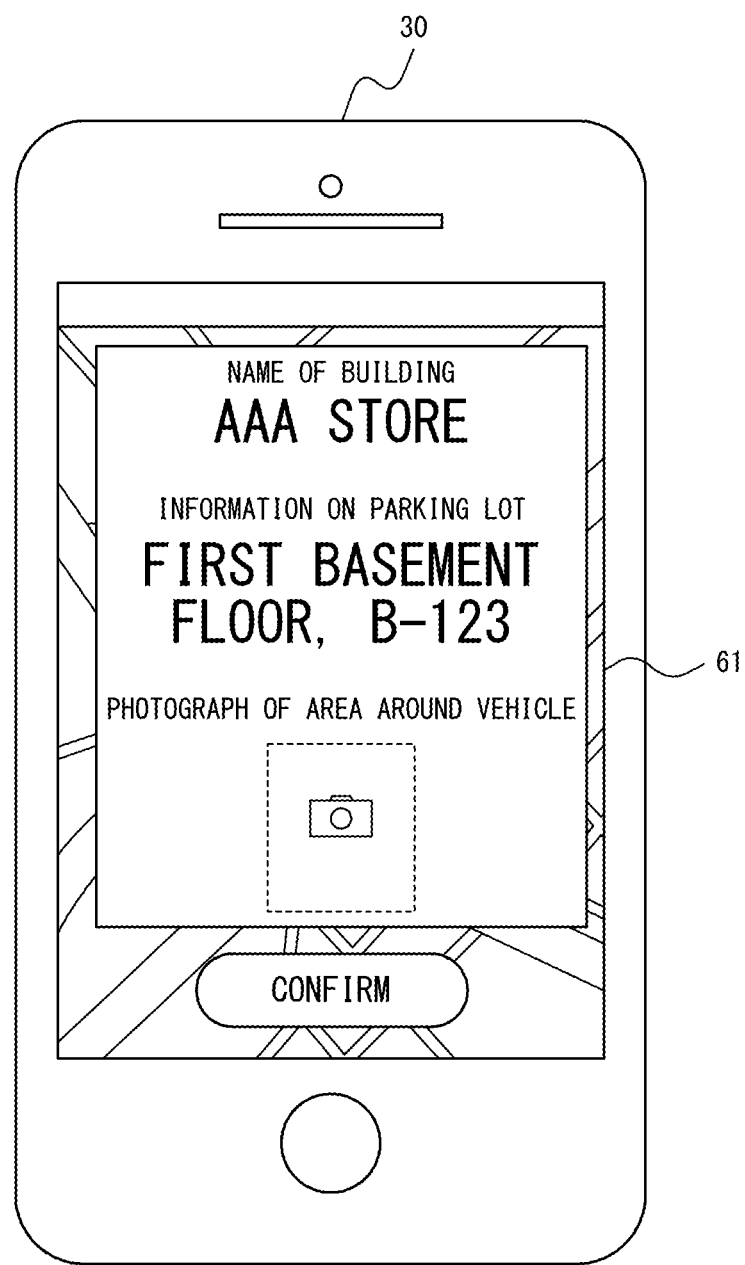
FIG. 5 is a diagram illustrating an example of a terminal screen corresponding to S4 in FIG. 4.

As an example of a terminal screen corresponding to S4, a first screen 61 is illustrated in FIG. 5. In the first screen 61, the name of the building "AAA Store" is displayed as the first information, and detailed information on the parking lot is entered as the second information, such as the parking floor "First Basement Floor" and the parking position number "B-123". The photograph of the area around the user vehicle V1 may be further input.

In S5, the controller 21 of the server apparatus 20 monitors the progress of the supply service. When the type of the supply service selected in S3 is the agent-type charging service or the agent-type battery replacement service, the controller 21 of the server apparatus 20 monitors the progress by communicating via the communication interface 23 with the mobile device held by the worker. When the type of the supply service selected in S3 is the mobile-type charging service, the controller 21 of the server apparatus 20 monitors the progress by communicating via the communication interface 23 with the in-vehicle device installed in the mobile charging vehicle or the mobile device held by the worker on board the mobile charging vehicle. When the type of the supply service selected in S3 is the mobile-type battery replacement service, the controller 21 of the server apparatus 20 monitors the progress by communicating via the communication interface 23 with the in-vehicle device installed in the mobile battery replacement vehicle or the mobile device held by the worker on board the mobile battery replacement vehicle. The controller 21 of the server apparatus 20 notifies the terminal apparatus 30 of the progress via the communication interface 23. The controller 31 of the terminal apparatus displays the progress to the display as the output interface 35.

Figure 6:
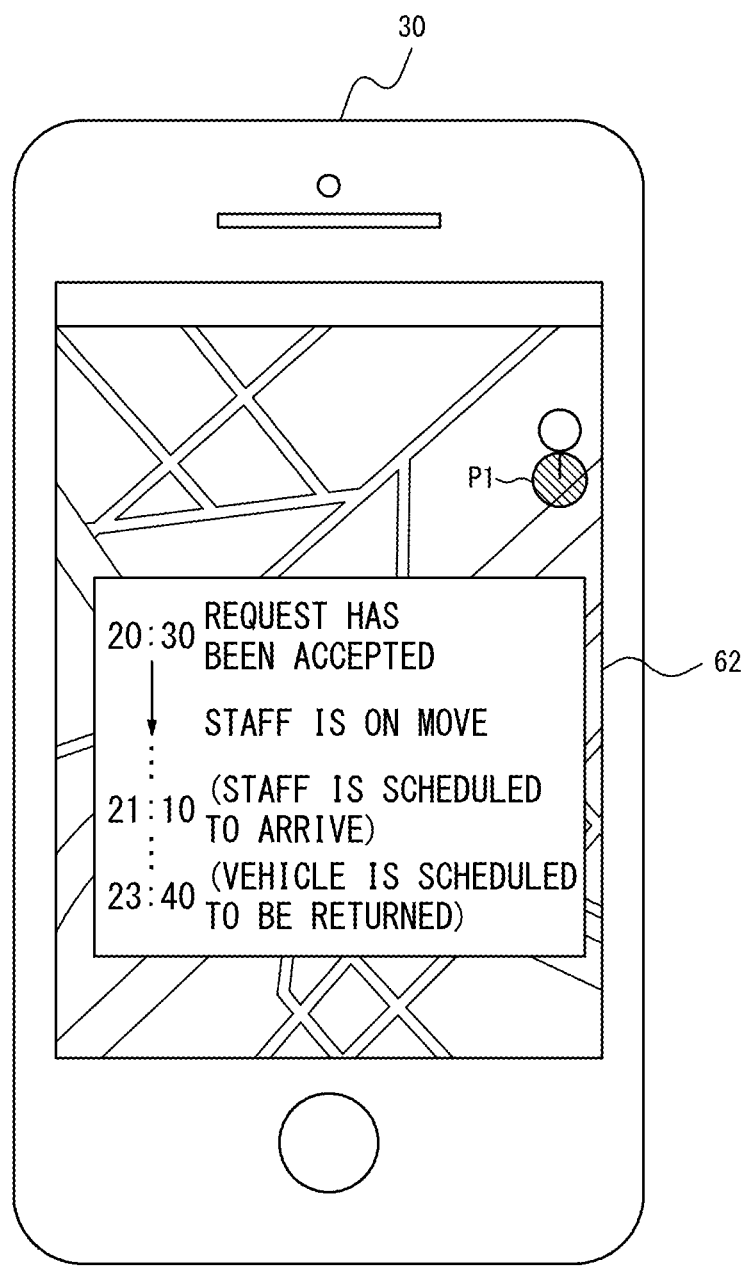
FIG. 6 is a diagram illustrating an example of a terminal screen corresponding to S5 in FIG. 4.

As an example of a terminal screen corresponding to S5, a second screen 62 is illustrated in FIG. 6. In the second screen 62, the time "20:30" when the supply service has been accepted and the current progress of the supply service "staff is on move" are displayed. The desired dispatch time "21:10" and the desired return time "23:40" are also displayed. The times are listed in ascending order. The position of the worker, the position of the mobile charging vehicle, or the position of the mobile battery replacement vehicle may be displayed on the map in real time. The user U1 may contact the worker who is heading for the parking location, using the terminal apparatus 30. When the type of the supply service selected in S3 is the agent-type charging service, the position P1 of the user vehicle V1 may be displayed on the map in real time after the user vehicle V1 is picked up, at least until the user vehicle V1 is moved to a charging station. When the type of the supply service selected in S3 is the agent-type battery replacement service, the position P1 of the user vehicle V1 may be displayed on the map in real time after the user vehicle V1 is picked up, at least until the user vehicle V1 is moved to a battery replacement station.

In S6, upon detecting completion of the supply service, the controller 21 of the server apparatus 20 notifies the terminal apparatus 30 of the completion via the communication interface 23. The controller 31 of the terminal apparatus 30 displays a screen indicating that the supply service has been completed, on the display as the output interface 35. In this screen, when the type of the supply service selected in S3 is the agent-type charging service or the agent-type battery replacement service, information regarding a position in which the worker has parked the user vehicle V1 may be displayed. A photograph of the user vehicle V1 taken by the worker may be displayed.

As a variation of the present embodiment, the controller 21 of the server apparatus 20 may determine whether a remaining energy source of the user vehicle V1 is less than or equal to a threshold value. When the remaining energy source of the user vehicle V1 is determined to be less than or equal to the threshold value, the controller 21 of the server apparatus 20 may perform, before receiving the request data, a process of dispatching the service staff 11 or the service vehicle 12 to a pre-designated location. For example, when a remaining battery level of the battery B1 of the user vehicle V1 is less than or equal to a threshold value, the controller 21 of the server apparatus 20 may perform a process of dispatching the service staff 11 or the service vehicle 12 to a location pre-tied to the user U1, such as the home of the user U1. Such a process may be performed only when the user vehicle V1 is located in the vicinity of the location pre-tied to the user U1 or when the user vehicle V1 is heading for the location pre-tied to the user U1. The controller 21 of the server apparatus 20 may perform a process of dispatching the service staff 11 or the service vehicle 12 to the most suitable location according to the destination, the route, or both, instead of or in addition to the remaining battery level of the battery B1. As an example, the controller 21 of the server apparatus 20 may suggest the best charging spot before a trip starts, if there is a possibility that the SOC may fall below the reference SOC for that trip. The term "SOC" is an abbreviation of state of charge.

The present disclosure is not limited to the embodiment described above. For example, two or more blocks described in the block diagrams may be integrated, or a block may be divided. Instead of executing two or more steps described in the flowcharts in chronological order in accordance with the description, the steps may be executed in parallel or in a different order according to the processing capability of the apparatus that executes each step, or as required. Other modifications can be made without departing from the spirit of the present disclosure.

The invention claimed is:

1. A non-transitory computer readable medium storing a terminal program for requesting a service to dispatch a service vehicle to a parking location in which a user vehicle is parked and cause the service vehicle to supply an energy source to the user vehicle, the terminal program being configured to cause a controller of a terminal apparatus used by a user of the user vehicle to execute operations, the operations comprising:

acquiring, before the user vehicle is parked in the parking location, first information regarding the parking location;

acquiring, before the user vehicle is parked in the parking location, second information indicating a desired dispatch time and a desired return time that are specified by the user, the desired dispatch time corresponding to a desired time when the service vehicle arrives in vicinity of the user vehicle, and the desired return time corresponding to a desired time when the service vehicle completes the supply of the energy source to the user vehicle;

transmitting, to a server apparatus, request data requesting the service, the request data including the first information and the second information, wherein the server apparatus, in response to receiving the request data, controls, by transmitting first instruction data including the first information and the second information to the service vehicle, the service vehicle to start traveling to the parking location before the user vehicle is parked in the parking location;

acquiring, after transmitting the request data, third information including more detailed information, not included in the first information, regarding the parking location, than the first information; and transmitting, to the server apparatus, notification data including the third information, wherein the server apparatus, in response to receiving the notification data, controls, by transmitting second instruction data including the third information to the service vehicle that has started the traveling, the service vehicle to arrive at the parking location by the desired dispatch time and complete the supply of the energy source to the user vehicle by the desired return time.

2. The non-transitory computer readable medium according to claim 1, wherein the third information is acquired after the user vehicle is parked in the parking location.

3. The non-transitory computer readable medium according to claim 1, wherein the service vehicle includes a mobile charging vehicle and a mobile battery replacement vehicle, and the service includes a charging service to supply the energy source to the user vehicle by the mobile charging vehicle charging a battery installed in the user vehicle, and a battery replacement service to supply the energy source to the user vehicle by the mobile battery replacement vehicle replacing the battery installed in the user vehicle with another battery.

4. The non-transitory computer readable medium according to claim 1, wherein the third information is acquired when details of the parking location are fixed by reservation, before the user vehicle is parked in the parking location.

5. The non-transitory computer readable medium according to claim 1, wherein the first information includes a name or address of a store or other building associated with a parking lot, a name or address of the parking lot, or a name of a municipality or other area in which the parking lot is located, and the third information includes a parking floor, a parking position number, two-dimensional or three-dimensional coordinates of a parking position, or a complete address of the parking lot.

6. The non-transitory computer readable medium according to claim 5, wherein the third information further includes a photograph of an area around the user vehicle when the user vehicle is parked in the parking location.

7. A server apparatus comprising:

a communication interface configured to communicate with a terminal apparatus used by a user of a user vehicle, the terminal apparatus being configured to request a service to dispatch a service vehicle to a parking location in which the user vehicle is parked and cause the service vehicle to supply an energy source to the user vehicle; and a controller configured to:

receive, from the terminal apparatus via the communication interface, request data requesting the service, the request data including first information and second information that are acquired by the terminal apparatus before the user vehicle is parked in the parking location, the first information regarding the parking location, the second information indicating a desired dispatch time and a desired return time that are specified by the user, the desired dispatch time corresponding to a desired time when the service vehicle arrives in vicinity of the user vehicle, and the desired return time corresponding to a desired time when the service vehicle completes the supply of the energy source to the user vehicle;

in response to receiving the request data, control, by transmitting first instruction data including the first information and the second information to the service vehicle, the service vehicle to start traveling to the parking location before the user vehicle is parked in the parking location;

receive, from the terminal apparatus via the communication interface, notification data including third information acquired by the terminal apparatus after the request data is transmitted, the third information including more detailed information, not included in the first information, regarding the parking location, than the first information; and in response to receiving the notification data, control, by transmitting second instruction data including the third information to the service vehicle that has started the traveling, the service vehicle to arrive at the parking location by the desired dispatch time and complete the supply of the energy source to the user vehicle by the desired return time.

8. The server apparatus according to claim 7, wherein third information is acquired by the terminal apparatus after the user vehicle is parked in the parking location.

9. The server apparatus according to claim 7, wherein the service vehicle includes a mobile charging vehicle and a mobile battery replacement vehicle, and the service includes a charging service to supply the energy source to the user vehicle by the mobile charging vehicle charging a battery installed in the user vehicle, and a battery replacement service to supply the energy source to the user vehicle by the mobile battery replacement vehicle replacing the battery installed in the user vehicle with another battery.

10. The server apparatus according to claim 9, wherein the controller is further configured to automatically select one of the charging service and the battery replacement service according to a positional relationship between the service vehicle and the parking location.

11. The server apparatus according to claim 7, wherein the third information is acquired by the terminal apparatus when details of the parking location are fixed by reservation, before the user vehicle is parked in the parking location.

12. The server apparatus according to claim 7, wherein the first information includes a name or address of a store or other building associated with a parking lot, a name or address of the parking lot, or a name of a municipality or other area in which the parking lot is located, and the third information includes a parking floor, a parking position number, two-dimensional or three-dimensional coordinates of a parking position, or a complete address of the parking lot.

13. The server apparatus according to claim 12, wherein the third information further includes a photograph of an area around the user vehicle when the user vehicle is parked in the parking location.

14. The server apparatus according to claim 7, wherein the controller is further configured to:

determine whether a remaining energy source of the user vehicle is less than or equal to a threshold value; and in response to determining that the remaining energy source of the user vehicle is less than or equal to the threshold value, dispatch the service vehicle to a location pre-tied to the user before receiving the request data.

15. The server apparatus according to claim 14, wherein the controller is further configured to dispatch the service vehicle to the location pre-tied to the user before receiving the request data, when the user vehicle is located in vicinity of the location pre-tied to the user or when the user vehicle is heading for the location pre-tied to the user.

16. A method performed by a server apparatus configured to communicate with a terminal apparatus used by a user of a user vehicle, the terminal apparatus being configured to request a service to dispatch a service vehicle to a parking location in which the user vehicle is parked and cause the service vehicle to supply an energy source to the user vehicle, the method comprising:

receiving, from the terminal apparatus, request data requesting the service, the request data including first information and second information that are acquired by the terminal apparatus before the user vehicle is parked in the parking location, the first information regarding the parking location, the second information indicating a desired dispatch time and a desired return time that are specified by the user, the desired dispatch time corresponding to a desired time when the service vehicle arrives in vicinity of the user vehicle, and the desired return time corresponding to a desired time when the service vehicle completes the supply of the energy source to the user vehicle;

in response to receiving the request data, controlling, by transmitting first instruction data including the first information and the second information to the service vehicle, the service vehicle to start traveling to the parking location before the user vehicle is parked in the parking location;

receiving, from the terminal apparatus, notification data including third information acquired by the terminal apparatus after the request data is transmitted, the third information including more detailed information, not included in the first information, regarding the parking location, than the first information; and in response to receiving the notification data, controlling, by transmitting second instruction data including the third information to the service vehicle that has started the traveling, the service vehicle to arrive at the parking location by the desired dispatch time and complete the supply of the energy source to the user vehicle by the desired return time.

17. The method according to claim 16, wherein the third information is acquired by the terminal apparatus after the user vehicle is parked in the parking location.

18. The method according to claim 16, wherein the service vehicle includes a mobile charging vehicle and a mobile battery replacement vehicle, and the service includes a charging service to supply the energy source to the user vehicle by the mobile charging vehicle charging a battery installed in the user vehicle, and a battery replacement service to supply the energy source to the user vehicle by the mobile battery replacement vehicle replacing the battery installed in the user vehicle with another battery.

19. The method according to claim 16, wherein the third information is acquired by the terminal apparatus when details of the parking location are fixed by reservation, before the user vehicle is parked in the parking location.

20. The method according to claim 16, wherein the first information includes a name or address of a store or other building associated with a parking lot, a name or address of the parking lot, or a name of a municipality or other area in which the parking lot is located, and the third information includes a parking floor, a parking position number, two-dimensional or three-dimensional coordinates of a parking position, or a complete address of the parking lot.

* * * * *